United States Patent [19]

Kuhlman et al.

[11] Patent Number: 5,046,096
[45] Date of Patent: Sep. 3, 1991

[54] WINDOWED ROTATABLE COVER WHICH REVEALS ONE INDICIA ON ONE SURFACE AND A SECOND INDICIA ON A SECOND SURFACE CORRESPONDING TO THE FIRST THAT ENCODES AND DECODES MESSAGES

[75] Inventors: Marvin G. Kuhlman, Des Plaines; Frank Cullotta, Elk Grove Village; J. A. Brhel, Des Plaines, all of Ill.

[73] Assignee: NCM International, Inc., Arlington Heights, Ill.

[21] Appl. No.: 506,433

[22] Filed: Apr. 9, 1990

[51] Int. Cl.⁵ .............................. G09C 1/06
[52] U.S. Cl. ...................... 380/57; 380/56; 283/94; 283/73
[58] Field of Search .............. 380/56, 57, 58, 59; 283/901, 73, 98, 99, 17, 94

[56] References Cited

U.S. PATENT DOCUMENTS 197,199  11/1877  Baldwin .......................... 380/57
1,271,000  7/1918  Wulf ............................... 380/57
1,441,109  1/1923  Newel ............................. 380/57
2,533,384  12/1950  Martinez ....................... 380/57
2,668,369  2/1954  Hepp .............................. 380/58

FOREIGN PATENT DOCUMENTS 0301967  12/1954  Fed. Rep. of Germany ........ 380/57

Primary Examiner—Thomas H. Tarcza
Assistant Examiner—Tod Swann
Attorney, Agent, or Firm—Wallenstein, Wagner & Hattis, Ltd.

[57] ABSTRACT

A simple and inexpensive apparatus for encoding and decoding messages is disclosed. The apparatus comprises a first surface having a first series of indicia and a second surface having a series of letters. Each of the letters correspond to a unique one of the indicia. The device further includes a cover for rotating one of the surfaces through a plurality of positions and sequentially revealing one of the indicia and its corresponding letter.

4 Claims, 2 Drawing Sheets

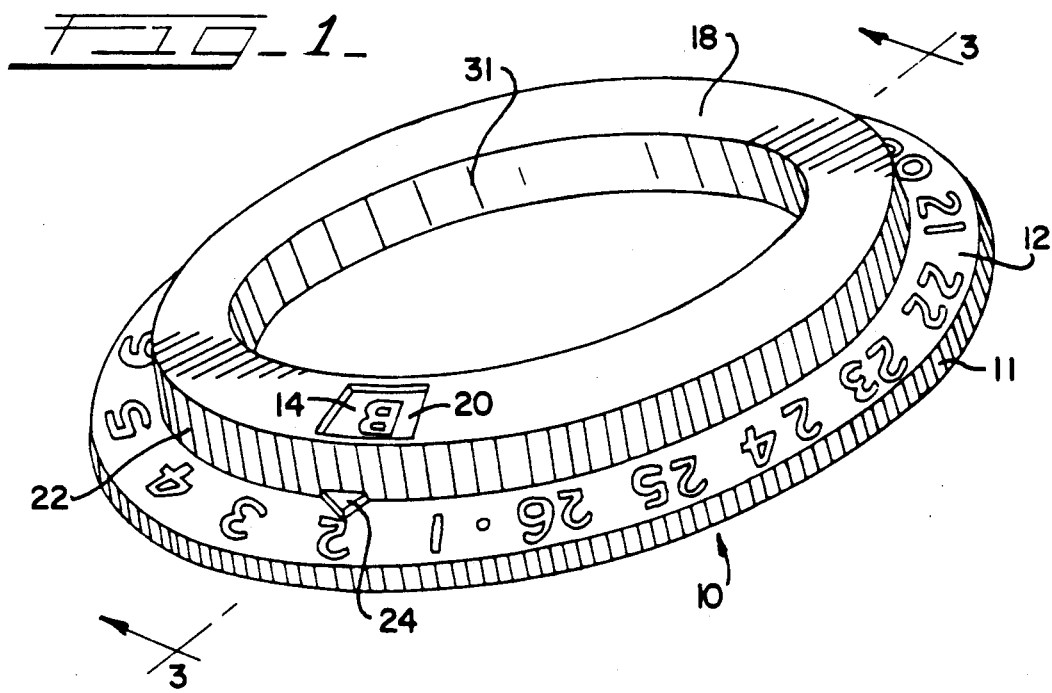
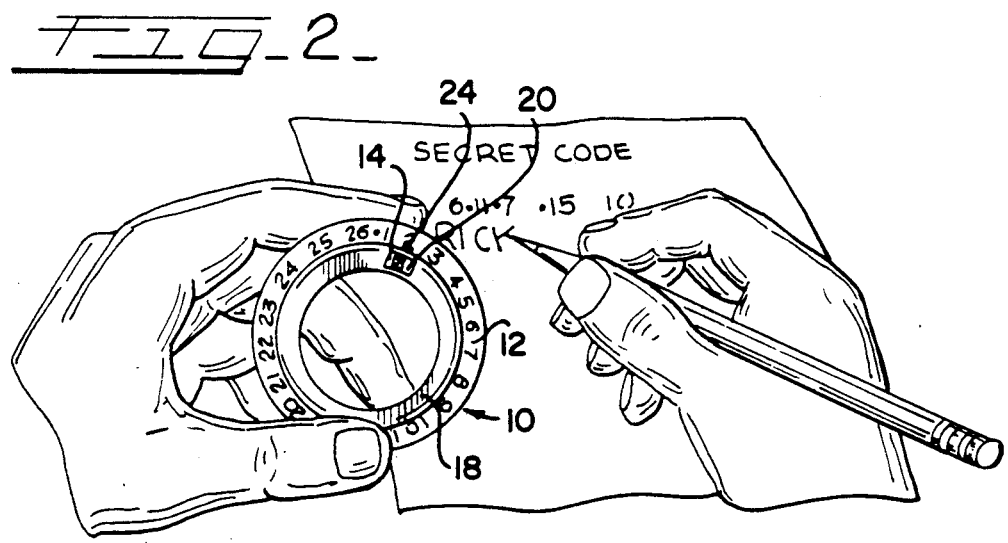
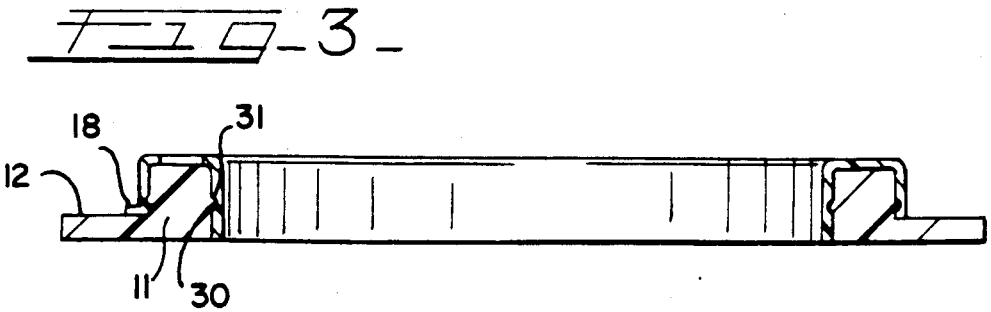

WINDOWED ROTATABLE COVER WHICH REVEALS ONE INDICIA ON ONE SURFACE AND A SECOND INDICIA ON A SECOND SURFACE CORRESPONDING TO THE FIRST THAT ENCODES AND DECODES MESSAGES

DESCRIPTION

1. Technical Field

This invention relates to an apparatus for encoding and decoding messages, and more particularly, to such an apparatus which is simple and inexpensive to construct.

2. Background Prior Art

Various devices to encode and decode messages have been previously developed. However, these devices have typically been both complicated and difficult to construct.

The present invention is provided to solve these and other problems.

SUMMARY OF THE INVENTION

It is an object of the invention to provide an apparatus for encoding and decoding messages The apparatus comprises a main body portion including a first surface having a first series of indicia and a second surface having a series of letters. Each of the letters on the second surface corresponds to a unique one of the indicia on the first surface. The apparatus further comprises means for rotating one of the surfaces through a plurality of positions and means responsive to the rotating means for sequentially revealing one of the indicia and its corresponding letter.

In accordance with one embodiment of the invention, the first surface comprises a first circular portion and the second surface comprises a second circular portion. The first circular portion includes a series of numbers. The second circular portion includes a series of each of the letters of the alphabet. The apparatus further comprises a ring for covering the second circular portion. The ring includes an arrow directed toward the first circular portion. The ring further includes a window to reveal a selected one of the letters. Thus as the ring is rotated and the arrow sequentially points to each of the numbers, a corresponding unique one of the letters is sequentially revealed through the window.

In accordance with another embodiment of the invention, the first surface comprises a first semi-circular portion and the second surface comprises a second semi-circular portion. The first semi-circular portion includes a first series of unique numbers and the second semi-circular portion includes each of the letters of the alphabet. The apparatus further comprises a cover disposed over the first and second semi-circular portions. The cover includes a pair of windows. One of the pair of windows reveals one of the numbers and the other of the pair of windows reveals a corresponding one of the letters.

Other features and advantages of the invention will be apparent from the following specification taken in conjunction with the following drawings.

BRIEF DESCRIPTION OF THE DRAWINGS

FIG. 1 is a perspective view of one embodiment of the invention,

FIG. 2 is a view of the embodiment of FIG. 1 illustrating its use;

FIG. 3 is a sectional view of the embodiment of FIG. 1, taken along line 3—3 thereof;

DETAILED DESCRIPTION

Figure 4:
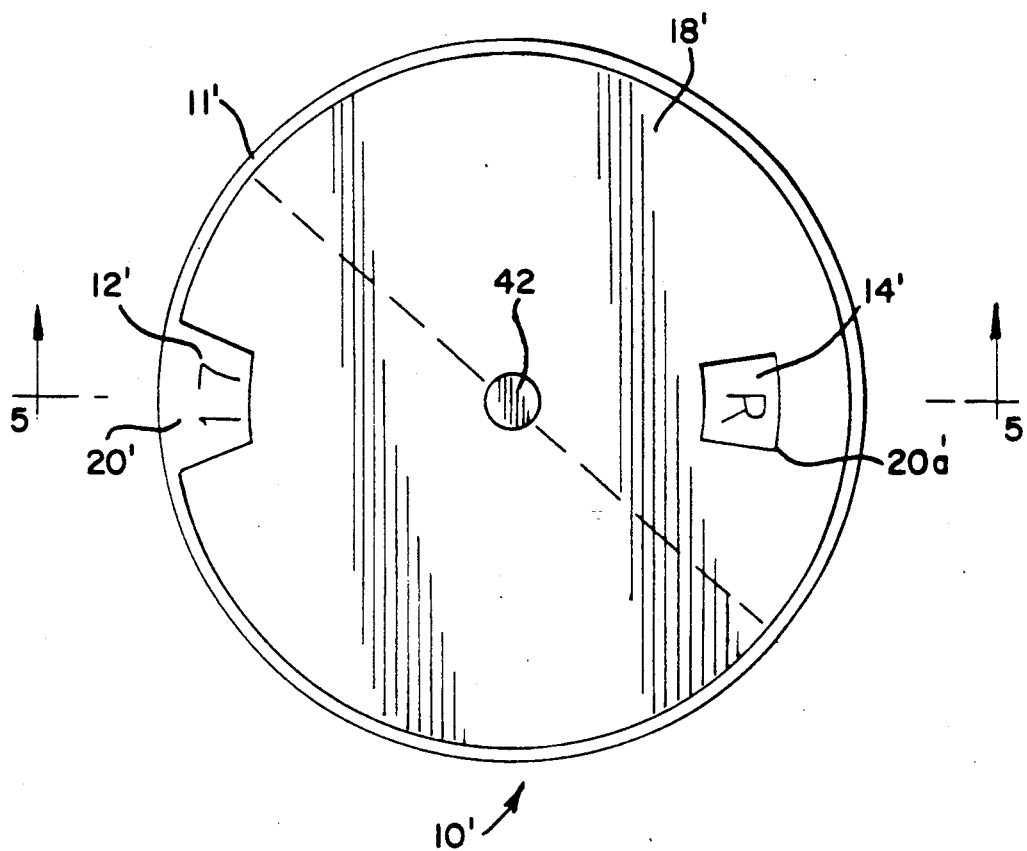
FIG. 4 is a perspective view of a second embodiment of the invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

A first embodiment of an apparatus 10 for encoding and decoding messages is illustrated in FIG. 1.

The apparatus 10 comprises a main body 11 having a first surface 12 and a second surface 14. The first surface 12 has a series of numbers "1–26", and the second surface 14 has a series of each of the letters of the alphabet. Each of the letters corresponds to a unique one of the numbers.

The apparatus 10 further includes a rotatable ring 18 disposed over, and thereby covering, the second surface 14. The ring 18 has a window 20 sized to reveal a selected one of the letters on the second surface 14. The ring 18 still further includes a side wall 22 from which a generally pointed tab 24 extends.

As the ring 18 is rotated, the letters on the second surface 14 are sequentially revealed through the window 20. In the preferred embodiment, each of the letters corresponds to a number representing the particular letter's position in the alphabet. For example, the letter "A" corresponds to the number "1", the letter "B" corresponds to the number "2", and the letter "Z" corresponds to the number "26". However, any other number-to-letter correspondence could be used without departing from the scope and spirit of the invention.

Operation of the apparatus 10 is illustrated in FIG. 2. In order to encode a message, such as the name "RICK", the ring 18 is first rotated until the letter "R" is revealed through the window 20. At that time, the tab 24 is pointed at the number "17", and the number "17" is written down. Next, the ring 18 is rotated until the letter "I" is revealed through the window 20. At that time, the tab 24 is pointed at the number "9", and the number "9" is written down. This is repeated for the letters "C" and "K" to obtain the respective numbers "3" and "11". Thus the number sequence "17-9-3-11" is the encoded representation of the message "R-I-C-K".

In order to decode a message, the preceding operation is repeated substantially in reverse. Specifically, the ring 18 is rotated until the tab 24 points to the first number of the message to be decoded. The decoded letter is then read through the window 20. This is repeated for each of the remaining numbers of the encoded message.

Indicia other than numbers, such as symbols or even other letters, can also be used. Further, the ring 18 could also be disposed over, and thereby cover, the first surface 12 rather than the second surface 14.

A sectional view of the apparatus 10 taken along line 3—3 of FIG. 1 is illustrated in FIG. 3. The ring 18 is retained on the main body 11 by means of a snap fit between a ridge 30 on the main body 11 and a corresponding groove 31 on the ring 18. The snap fit is sufficient to prevent the ring 18 from falling off of the main body 11, yet still permit the ring 18 to rotate.

A second embodiment of the invention is disclosed in FIG. 4. Reference numbers of related elements have been maintained, but a "prime" has been added thereto.

According to the second embodiment 10, a main body 11' has a substantially flat surface defining first 12' and second 14' semi-circular portions (illustrated in phantom). The first semi-circular portion 12' has a series of numbers "1–26" and the second semi-circular portion 14' has a series of each of the letters of the alphabet. As with the first embodiment, discussed above, each of the letters correspond to a unique one of the numbers.

A cover 18' is disposed over the first and second semi-circular portions 12', 14', respectively, and includes first 20' and second 20a' windows spaced 180 degrees apart. The first window 20' reveals one of the numbers, and the second window 20a' reveals the corresponding one of the letters.

In order to encode a message, such as the name "RICK", the cover 18' is first rotated until the letter "R" is revealed through the second window 20a'. At that time, the first window 20' reveals the number "17", and the number "17" is written down. Next, the cover 18' is rotated until the letter "I" is revealed through the second window 20a'. At that time, the first window 20' reveals the number "9", and the number "9" is written down. This is repeated for the letters "C" and "K" to obtain the respective numbers "3" and "11". Thus, as with the first embodiment, the number sequence "17-9-3-11" is the encoded representation of the message "R-I-C-K".

As also with the first embodiment, in order to decode a message, the preceding operation is repeated in reverse. Additionally, indicia other than numbers, such as symbols or even other letters, can also be used.

Figure 5:
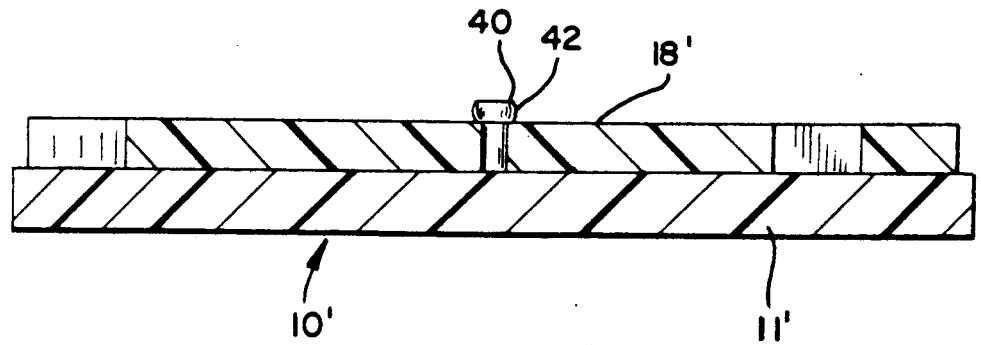
FIG. 5 is a sectional view of the embodiment of FIG. 4, taken along line 5—5 thereof.

A sectional view of the second embodiment 10'
taken along line 5—5 of FIG. 4 is illustrated in FIG. 5 The cover 18' is retained on the main body 11 by means of a snap fit between a post 40, extending upwardly from the main body portion 11', and a hole 42 extending through the cover 18'. The snap fit is sufficient to prevent the cover 18' from falling off of the post 40, yet still permit the cover 18' to rotate.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:
1. A device for encoding and decoding messages comprising:
   a main body portion including a ring having an outer ring portion defining a first surface and an inner ring portion defining a second surface, said first surface having a first series of indicia and said second surface having a series of alphanumeric characters, each of said alphanumeric characters corresponding to a unique one of said indicia;
   a second body portion rotatably secured to said main body portion and including a surface;
   means for rotating said second body portion through a plurality of positions relative to said main body portion; and
   means in said second body portion for sequentially revealing a single one of said indicia and its corresponding alphanumeric character.

2. The device of claim 1, wherein said second body portion comprises a rotatable ring disposed over said inner ring portion, said rotatable ring including a window for revealing a single said letter positioned below said window on said inner ring portion.

3. A device for encoding and decoding messages comprising:
   a main body portion including a first surface defining a first semicircular portion and a second surface defining a second semicircular portion, said first surface having a first series of indicia and said second surface having a series of alphanumeric characters, each of said alphanumeric characters corresponding to a unique one of said indicia;
   a second body portion rotatably secured to said main body portion and including a surface;
   means for rotating said second body portion through a plurality of positions relative to said main body portion; and
   means in said second body portion for sequentially revealing a single one of said indicia and its corresponding alphanumeric character.

4. The device of claim 3 wherein said second body portion comprises a rotatable cover disposed over said first and second semi-circular portions, said rotatable cover including a pair of opposing windows, one of said windows for revealing one of said indicia and the other of said windows for revealing a corresponding one of said letters.

* * * * *